Patented Aug. 16, 1932

1,871,947

UNITED STATES PATENT OFFICE

GÉRALD BONHÔTE, OF BASEL, SWITZERLAND, ASSIGNOR TO THE FIRM SOCIETY OF CHEMICAL INDUSTRY IN BASLE, OF BASEL, SWITZERLAND

AZO-DYESTUFFS AND PROCESS OF MAKING SAME

No Drawing. Application filed October 24, 1931, Serial No. 570,980, and in Switzerland November 3, 1930.

The present invention relates to the manufacture of new azo-dyestuffs. It comprises the process of making these dyestuffs, as well as the new dyestuffs themselves.

It has been found that new azo-dyestuffs are obtained by diazotizing aminoazo-dyestuffs of the general formula

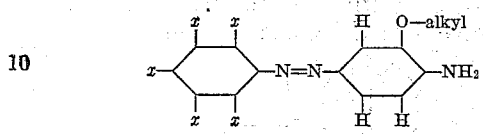

in which of the five $x$'s two stand for substituents from a group of substituents comprising alkyl and alkoxy or for hydrogen, and the other three stand for hydrogen, and coupling the diazo-compound with an arylide of 2:3-hydroxynaphthoic acid or a derivative thereof, having in the naphthalene nucleus further substituents and capable of being coupled in the 1-position, or with a 1-hydroxynaphthalene-4-ketone.

Among these products those are particularly valuable which are obtained from non-sulfonated and non-carboxylated arylides of the 2:3-hydroxynaphthoic acid. They thus correspond to the general formula

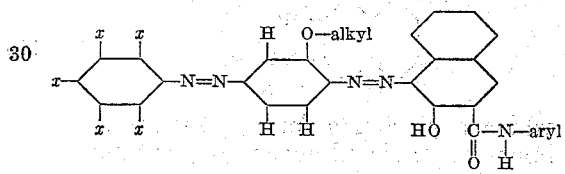

in which the $x$'s have the above defined significations, and aryl means a non-sulfonated and non-carboxylated aryl nucleus of the benzene or naphthalene series. These new dyestuffs are characterized by their good properties of fastness. When they are produced on the fibre, Bordeaux red to garnet and violet tints are obtained, which are characterized by their good fastness to washing, chlorine and bowking. In this respect the dyestuffs excel those which can be made from aminoazo-dyestuffs which correspond with the first of the above general formulas, with the difference that one or more of the $x$'s stand for negative substituents.

The following examples illustrate the invention, the parts being by weight:—

Example 1

22.8 parts of 4'-amino-5'-ethoxyazobenzene are diazotized as usual and the product is introduced into a solution of 29.3 parts of 2:3-hydroxynaphthoic acid-para-anisidide, 60 parts of caustic soda solution of 30 per cent. strength and 15 parts of calcined sodium carbonate in 2000 parts of water. The dyestuff thus formed, which corresponds with the formula

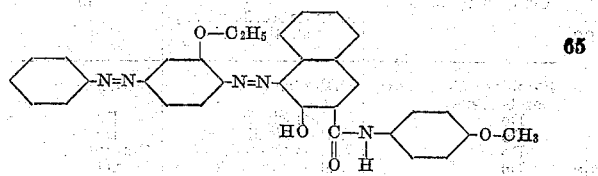

is immediately precipitated. The garnet-red precipitate is filtered, washed and dried.

Example 2

Cotton yarn is impregnated with a grounding liquor, made by dissolving 5 grams of the α-naphthylamine of 2:3-hydroxynaphthoic acid in 300 cc. of hot water with addition of 10 cc. of caustic soda solution of 30 per cent. strength and 10 cc. of Turkey red oil, the whole being diluted to 1 litre. The yarn is then wound off and developed in a solution, neutralized with sodium acetate, containing 3 grams of diazotized 4-methyl-4'-amino-5'-methoxyazobenzene per litre. There is produced a deep currant tint of excellent properties of fastness. The new dyestuff corresponds with the formula

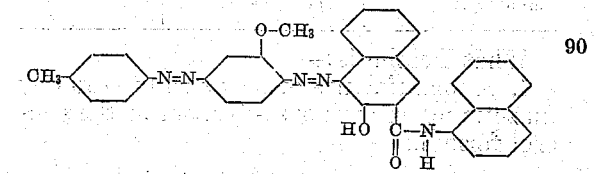

Example 3

The material which is to be printed is treated in the Foulard machine with an alkaline solution containing per litre 10 grams of ortho-anisidide of 2:3-hydroxynaphthoic acid. After drying, the material is printed with a printing colour containing per kilo 6 grams of diazotized 4:5'-dimethoxy-4'-amino-azobenzene. The deep violet colour develops quickly and is remarkably fast. The new dyestuff corresponds with the formula.

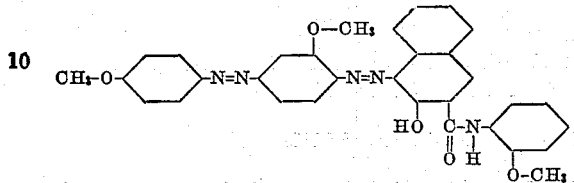

If these dyestuffs are to be produced on wool it is advantageous to work according to the particulars of British Patent No. 310,758. In that patent it has been disclosed that for the dyeing of wool with arylides of 2:3-hydroxynaphthoic acid it is advantageous to use such grounding baths which contains per liter 0.6 to 1.8 grams of sodium hydroxide.

The following table indicates the tints produced on the fibre by some of the dyestuffs of this invention:—

| Component diazotized | Coupling component Arylides of 2:3-hydroxynaphthoic acid | Tint |
|---|---|---|
| 4'-amino-5'-methoxy-azobenzene | Ortho-toluidide | Garnet |
| Do | Para-anisidide | Do |
| Do | Ortho-anisidide | Do |
| Do | Meta-nitranilide | Currant |
| Do | Meta-chloranilide | Garnet |
| Do | Para-cresidide | Do |
| Do | 2:5-dichloranilide | Currant |
| Do | Para-phenetidide | Garnet |
| Do | Ortho-phenetidide | Bordeaux |
| Do | 4-chloro-2-toluidide | Currant-violet |
| Do | β-naphthylamide | Garnet |
| Do | α-naphthylamide | Currant |
| Do | Para-chloranilide | Garnet |
| 4-methyl-4'-amino-5'-methoxyazobenzene | Ortho-anisidide | Do |
| Do | Para-anisidide | Blue-Bordeaux |
| Do | 5-chloro-2-toluidide | Violet |
| Do | β-naphthylamide | Garnet |
| Do | α-naphthylamide | Violet |
| Do | Anilide | Blue-Bordeaux |
| Do | Ortho-phenetidide | Bordeaux |
| 4:5'-dimethoxy-4'-amino-azobenzene | Meta-toluidide | Garnet |
| Do | Ortho-anisidide | Currant |
| Do | Para-anisidide | Do |
| Do | 5-chloro-2-toluidide | Do |
| Do | β-naphthylamide | Do |
| Do | α-naphthylamide | Garnet |
| Do | Anilide | Violet |
| 4:5'-dimethoxy-4'-amino-azobenzene | Meta-toluidide | Do |
| Do | Meta-toluylene-diamide | Currant |
| Do | Para-toluidide | Violet-garnet |
| Do | Ortho-toluidide | Violet |
| Do | Ortho-anisidide | Garnet-violet |
| 4'-amino-5'-methoxy-azobenzene | 1-hydroxynaphthalene-4-phenylketone | Garnet |

What I claim is:—

1. A manufacture of new azo-dyestuffs by diazotizing an aminoazo-dyestuff of the general formula

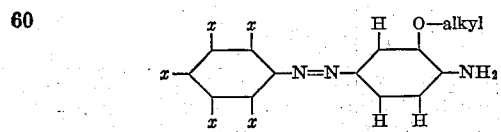

in which of the five $x$'s two stand for substituents from a group of substituents consisting of alkyl and alkoxy or for hydrogen, and the other three stand for hydrogen, and coupling the diazo-compound thus produced with an arylide of the 2:3-hydroxynaphthoic acid of the general formula

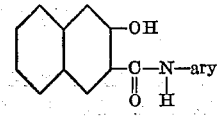

in which aryl stands for a non-sulfonated and non-carboxylated nucleus of the benzene or naphthalene series.

2. A manufacture of new azo-dyestuffs by diazotizing an aminoazo-dyestuff of the general formula

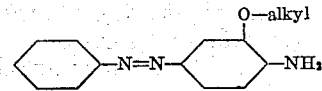

and coupling the diazo-compound thus produced with an arylide of the 2:3-hydroxynaphthoic acid of the general formula

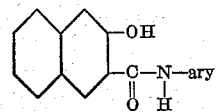

in which aryl stands for a non-sulfonated and non-carboxylated nucleus of the benzene or naphthalene series.

3. A manufacture of new azo-dyestuffs by diazotizing the aminoazo-dyestuff of the formula

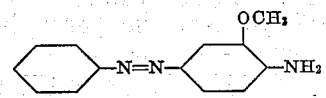

and coupling the diazo-compound thus produced with an arylide of the 2:3-hydroxynaphthoic acid of the general formula

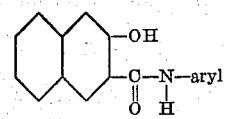

in which aryl stands for a non-sulfonated and non-carboxylated nucleus of the benzene or naphthalene series.

4. A manufacture of a new azo-dyestuff by diazotizing the aminoazo-dyestuff of the formula

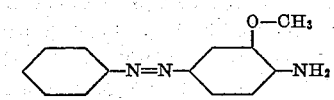

and coupling the diazo-compound thus produced with the arylide of the formula

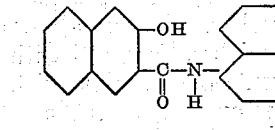
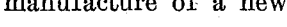

5. A manufacture of a new azo-dyestuff by diazotizing the aminoazo-dyestuff of the formula

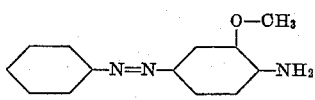

and coupling the diazo-compound thus produced with the arylide of the formula

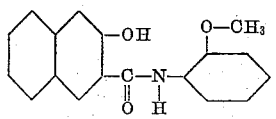

6. A manufacture of a new azo-dyestuff by diazotizing the aminoazo-dyestuff of the formula

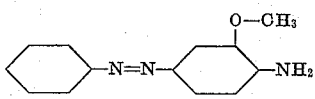

and coupling the diazo-compound thus produced with the arylide of the formula

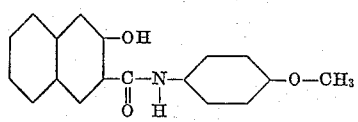

7. As new products the azo-dyestuffs of the general formula

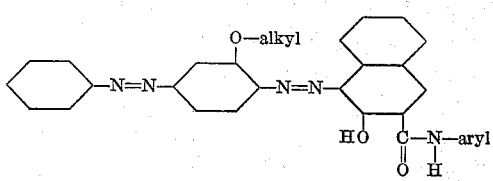

in which of the five $x$'s two stand for substituents from a group of substituents consisting of alkyl and alkoxy or for hydrogen, and the other three stand for hydrogen, and in which aryl stands for a non-sulfonated and non-carboxylated nucleus of the benzene or naphthalene series, which products, in a dry state, are dark powders, and which, in case they are produced on the fibre, dye the same full Bordeaux-red to violet tints.

8. As new products the azo-dyestuffs of the general formula

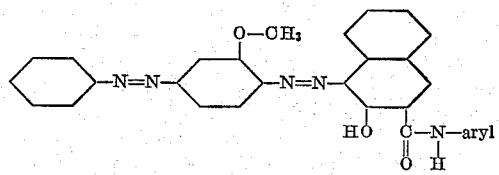

in which aryl stands for a non-sulfonated and non-carboxylated nucleus of the benzene or naphthalene series, which products, in a dry state, are dark powders, and which, in case they are produced on the fibre, dye the same full Bordeaux-red to violet tints.

9. As new products the azo-dyestuffs of the general formula in which aryl stands for a non-sulfonated and non-carboxylated nucleus of the benzene or naphthalene series, which products, in a dry state, are dark powders, and which, in case they are produced on the fibre, dye the same full Bordeaux-red to violet tints.

10. As a new product the azo-dyestuff of the formula

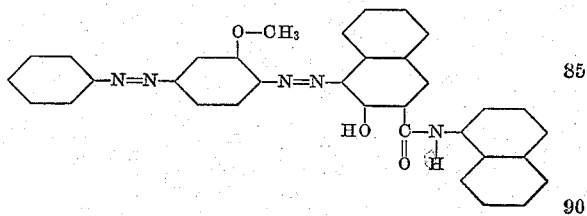

which product, in a dry state, is a dark powder, and which, in case it is produced on the fibre, dyes the same full current tints.

11. As a new product the azo-dyestuff of the formula

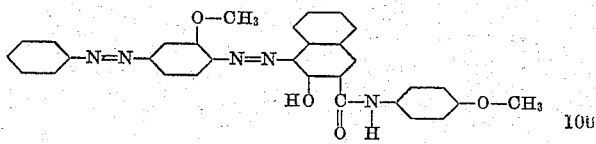

which product, in a dry state, is a dark powder, and which, in case it is produced on the fibre, dyes the same full garnet tints.

12. As a new product the azo-dyestuff of the formula

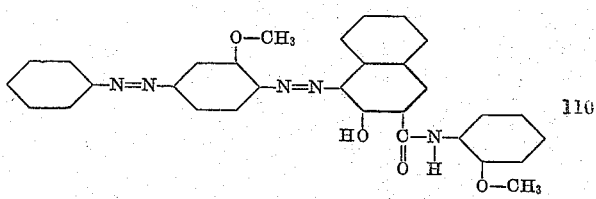

which product, in a dry state, is a dark powder, and which, in case it is produced on the fibre, dyes the same full garnet tints.

In witness whereof I have hereunto signed my name this 17th day of October, 1931.

GÉRALD BONHÔTE.